US012655003B2

(12) United States Patent
Piani

(10) Patent No.: US 12,655,003 B2
(45) Date of Patent: Jun. 16, 2026

(54) MULTIFUNCTIONAL DEVICE FOR MANAGING A PALLET WITH ITS LOAD

(71) Applicant: TOPPY S.R.L., Valsamoggia (IT)

(72) Inventor: Daniele Piani, Monte San Pietro (IT)

(73) Assignee: TOPPY S.R.L., Valsamoggia (IT)

( * ) Notice: Subject to any disclaimer, the term of this patent is extended or adjusted under 35 U.S.C. 154(b) by 0 days.

(21) Appl. No.: 19/140,214

(22) PCT Filed: Dec. 14, 2023

(86) PCT No.: PCT/EP2023/085951
§ 371 (c)(1),
(2) Date: Jun. 17, 2025

(87) PCT Pub. No.: WO2024/132881
PCT Pub. Date: Jun. 27, 2024

(65) Prior Publication Data
US 2026/0015214 A1      Jan. 15, 2026

(30) Foreign Application Priority Data

Dec. 22, 2022      (IT) ........................ 102022000026544

(51) Int. Cl.
*B66F 9/04*          (2006.01)
*B65G 1/00*          (2006.01)
(52) U.S. Cl.
CPC .................. *B66F 9/04* (2013.01); *B65G 1/00* (2013.01); *B65G 2201/0267* (2013.01)
(58) Field of Classification Search
CPC ...... B66F 9/04; B65G 1/00; B65G 2201/0267
See application file for complete search history.

(56) References Cited

U.S. PATENT DOCUMENTS 865,096  A  *  9/1907  Foster ........................ F16L 1/06
                                                         414/758
5,088,877  A  *  2/1992  Henk ........................ B65G 1/00
                                                         414/790

(Continued)

FOREIGN PATENT DOCUMENTS

CN        105 173 203  A      12/2015
CN         105173203       * 12/2015 ............. B65B 35/56

(Continued)

OTHER PUBLICATIONS

International Search Report (ISR) and Written Opinion of the International Searching Authority (ISA/EP) mailed Apr. 2, 2024, International Application No. PCT/EP2023/085951 filed Dec. 14, 2023, 14 pages total.

*Primary Examiner* — Lynn E Schwenning
(74) *Attorney, Agent, or Firm* — Francis J. Maguire; WARE FRESSOLA MAGUIRE & BARBER LLP

(57)                    ABSTRACT

Multifunctional device for managing a pallet with its load includes: —a base element (3) assigned to be placed and/or fixed to a floor or surface; —a frame member (5) connected to the base element (3) via a motorized rotation member (7) which can be operated to rotate the frame member around a horizontal or nearly horizontal rotation axis (R); —at least one pair of platform elements first (9) and second (11) facing each other and defining respective geometric planes parallel to each other and to the rotation axis (R), where at least the first platform element (9) can be operated, by means of a respective actuator, approaching and moving away from the second platform element (11); —at least one pair of wall elements first (15) and second (17) facing each other and defining respective geometric planes parallel to each other and to the rotation axis (R) and perpendicular to said platform elements (9, 11), where at least the second wall (Continued)

element (17) can be operated, by means of a respective actuator, approaching and moving away from the first wall element (15).

8 Claims, 8 Drawing Sheets

(56)              References Cited

U.S. PATENT DOCUMENTS

| | | | |
|---|---|---|---|
| 5,295,309 A | 3/1994 | Kozlowski | |
| 2006/0104803 A1 | 5/2006 | Wanninger et al. | |

FOREIGN PATENT DOCUMENTS

| | | | | |
|---|---|---|---|---|
| CN | 110 510 376 A | 11/2019 | | |
| CN | 113 120 648 A | 7/2021 | | |
| CN | 113 734 843 A | 12/2021 | | |
| CN | 113734843 | * 12/2021 | ............. | B65H 15/02 |
| GB | 1 267 657 A | 3/1972 | | |
| WO | 2022/058787 A1 | 3/2022 | | |

* cited by examiner

1

5

17

15

7

3

MULTIFUNCTIONAL DEVICE FOR MANAGING A PALLET WITH ITS LOAD

TECHNICAL FIELD

The present invention relates to the technical field concerning the logistics and in particular refers to a multifunctional device for the management of a pallet with its load consisting of packages or boxes containing material, including fragile and/or non-overturnable material or bags or envelopes with almost any content which is assigned, for example, to replace the pallet that supports said load and/or to consolidate a previously destabilized and/or moved load, for example during the preparation or transport phase.

PRIOR ART

There are known devices for replacing a pallet that supports a load by gripping the latter and moving it away from the pallet which can then be removed and replaced. The load is taken by means of movable side walls operated to tighten the load and to keep it suspended. A disadvantage of such devices consists in the fact that they are not suitable for operating with loads consisting of boxes or packages that are not sufficiently robust or, in general, with bags or envelopes.

There are also known devices for replacing a pallet that supports a load by rotating the pallet-load complex until the latter no longer weighs on the pallet and allows it to be removed and replaced. A disadvantage of such known rotation device consists in the fact that it is not suitable for loads including articles that cannot be overturned or tilted, for example wines, certain equipment, spare parts or consumable parts containing dust or liquids.

Therefore, a logistics center that must handle all types of goods and must replace the pallets supporting the loads must use at least both types of machines.

These logistics centers must also face the problem of rearranging and stabilizing loads which, for example due to impacts and stresses or preparation defects, have lost their original structure and/or have become destabilised. Currently, such problem is usually solved, in an expensive, slow and unsafe way, by separating the packages of the cargo and reconstituting it from scratch by hand.

Prior art document CN 110 510 376 A discloses a pallet converter including a base and a rotating frame, the latter includes a rotating body, a left clamping arm, a right clamping arm, a conveying device, and an upper clamp arm. The middle parts of the left and right sides of the rotating body are rotatably connected to the base. The left and right ends of the base are provided with bearing seats and the middle parts of the two ends of the rotating body are provided with rotating shafts. The bearing seats at both ends of the base are also provided with a motor for driving the rotation of the rotation base. The rotation axis of said known pallet converter device is orthogonal in respect to the faces of the left and the right clamping arms. Said known pallet converter device is affected by the drawback to allow the putting of a load into the device only in the lower position of the conveying device, consequently the maximum width of the load is limited by the width of the conveying device. The known device is thus not fit for operating with large loads (as, for instance, solar panel, insulating plate, etc.), with loads to be stored onto small vertically spaced shelves, and with loads handled and moved with an orthogonal orientation, for instance pallet forked through the longest sides, etc. except to provide an exceptional large (and thus expensive and bulky) device and the adoption of very long stroke actuators.

DISCLOSURE OF THE INVENTION

An object of the present invention is to propose a multifunctional device for managing a pallet with its load fit for loading and operating such pallet and load having any orientation and/or any direction of the respective main longitudinal axis, including standard pallet and vertical load or horizontally extending loads as elongated panels, slabs and plates.

A further object of the present invention is to propose a single multifunctional device for managing a pallet with its load, which is capable of replacing a pallet for each type of load and which, at the same time, is capable of rearranging a load, restoring its stability.

Another object is to propose an integrated device that is relatively simple, reliable and economical to purchase and maintain.

A further object is to propose a device suitable for different types and sizes of pallets and for loads of almost any type, for example consisting of crates, robust and fragile boxes, light and/or fragile packages, parcels envelopes, bags or other flexible containers.

Another object is to propose a programmable device capable of operating in a semi-automatic or automatic manner.

BRIEF DESCRIPTION OF THE DRAWINGS

The characteristics of the invention are highlighted below with particular reference to the attached drawings in which.

BEST MODE TO CARRY OUT THE INVENTION

Figure 1:
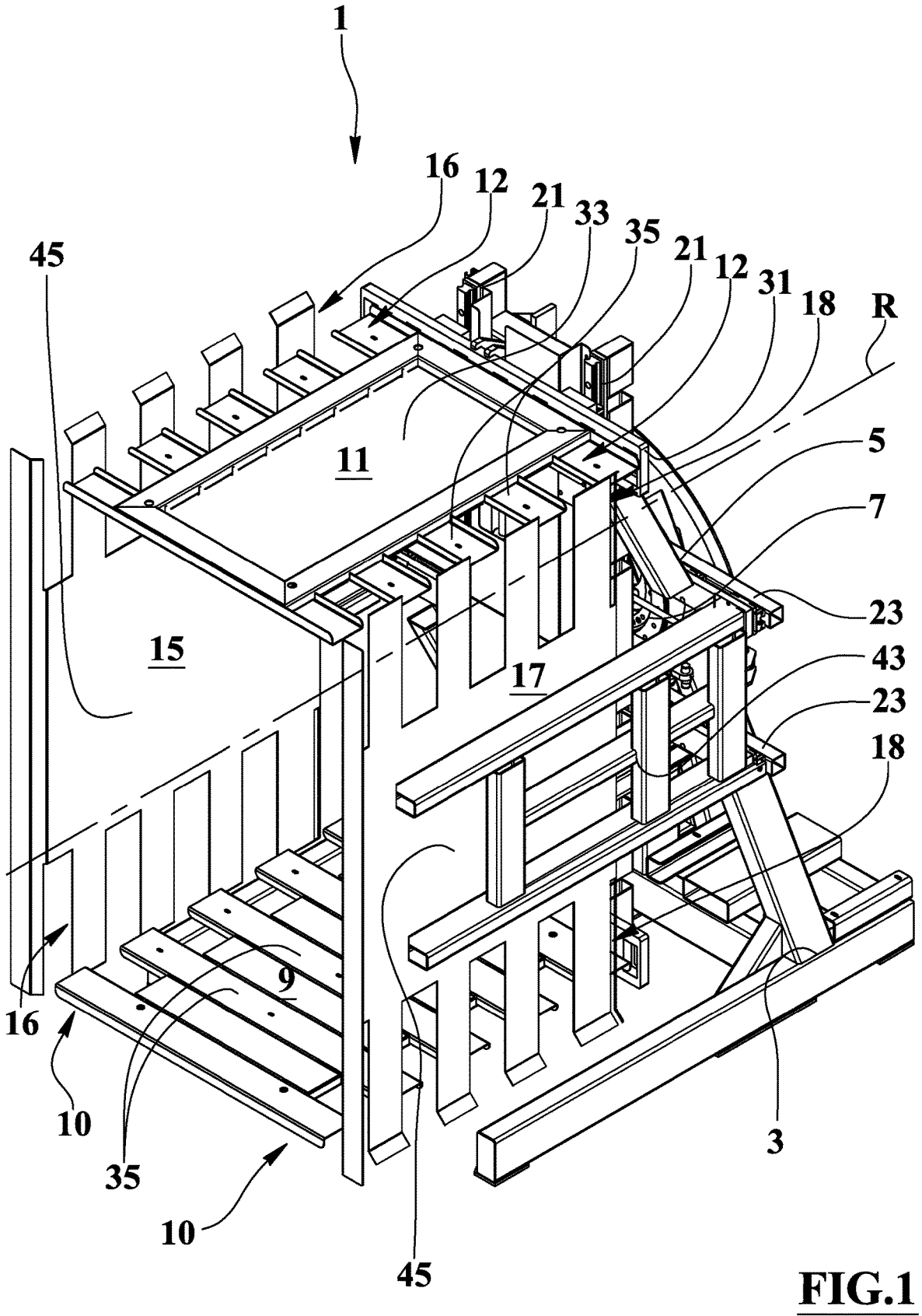
FIG. 1 illustrates an axonometric view of the multifunctional device for managing a pallet with its load, object of the present invention.
Figure 2:
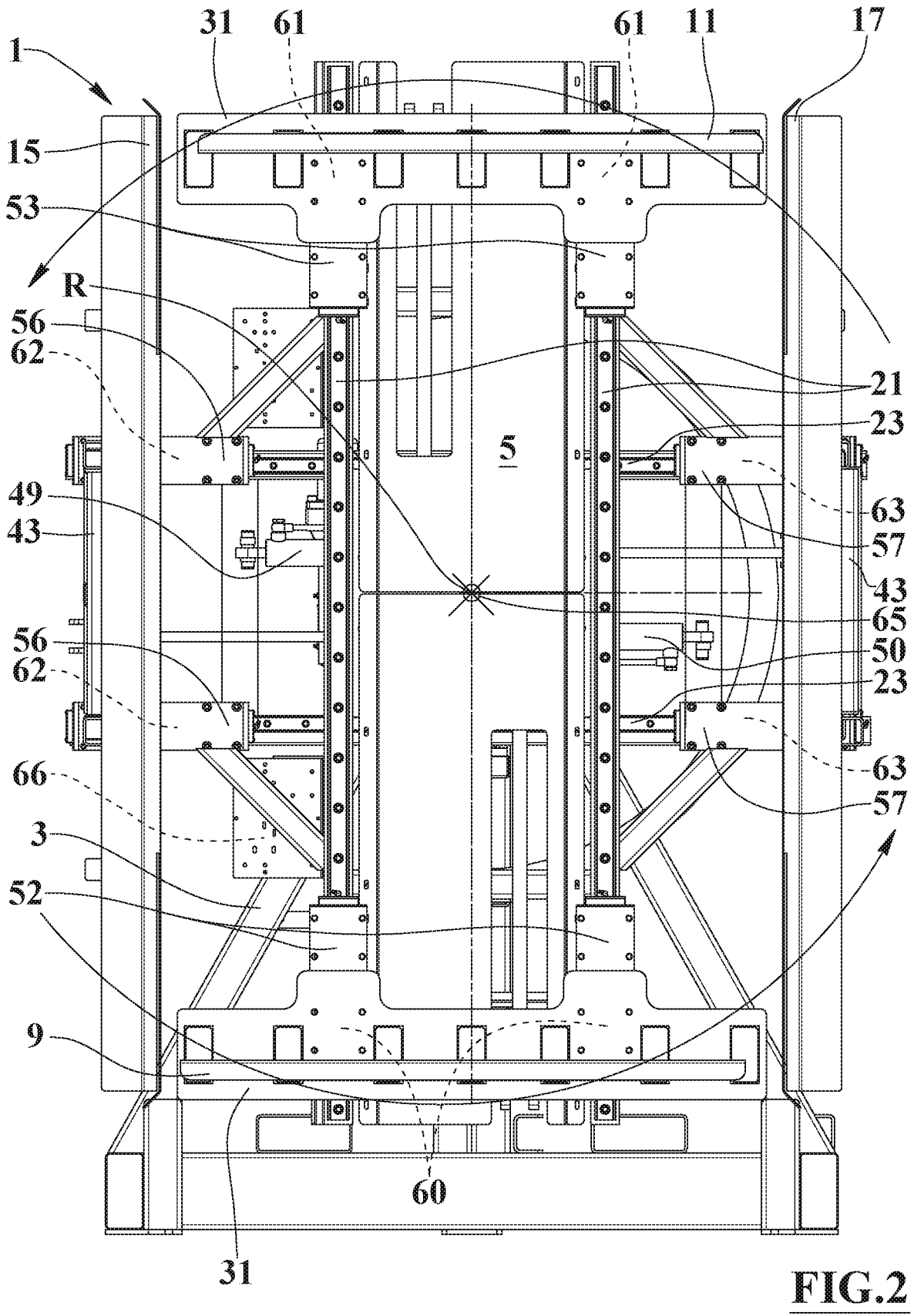
FIGS. 2-4 illustrate respectively front, top and rear orthogonal projection views of the device in FIG. 1.
Figure 3:
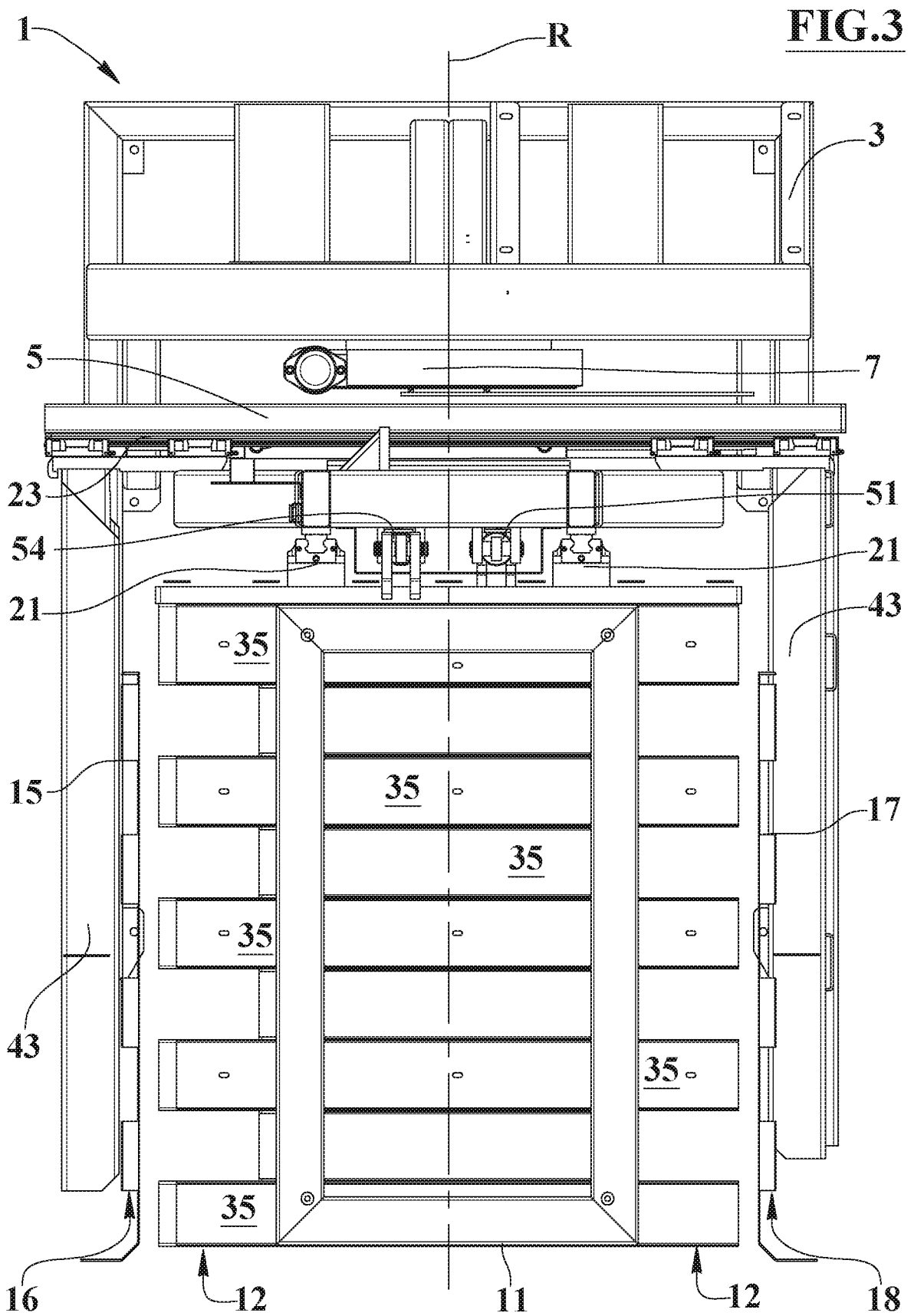
Figure 4:
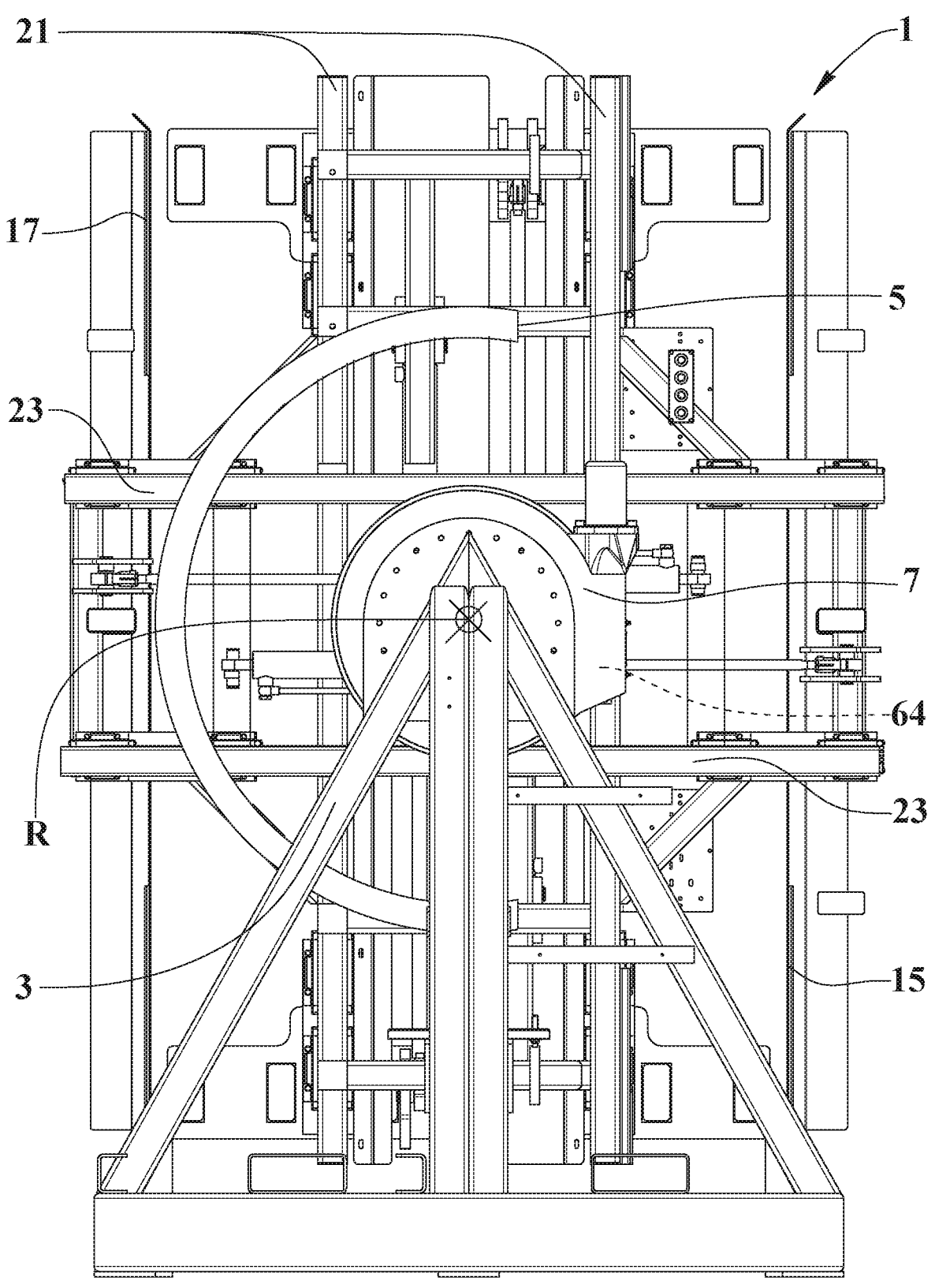

With reference to FIGS. 1-4, numeral 1 indicates the multifunctional device for managing a pallet with its load, object of the present invention, comprising:

a base element 3, for example of a lattice truss or beam frame type with a "C" shaped base assigned to be placed on, and/or fixed to, a floor or plane and an inverted "V" shaped vertical upright whose vertex constitutes a support;

a frame member 5, for example made up of beams and/or profiles, whose central portion is connected to said support vertex of the base element 3 by means of a motorized rotation member 7 which can be operated to rotate the frame member around to a horizontal or nearly horizontal rotation axis R;

at least a pair of platform elements first 9 and second 11 facing each other and defining respective geometric planes parallel to each other and to the rotation axis R, where the platform elements first 9 and second 11 are independently operable, by means of respective actuators, in mutual approach and moving away;

at least a pair of wall elements first 15 and second 17 facing each other and defining respective geometric planes parallel to each other and to the rotation axis R and perpendicular to said platform elements 9, 11, where the wall elements first 15 and second 17 are independently operable, by means of respective actuators, approaching and moving away from each other.

The rotation member 7 is therefore interconnected between the base element 3 and the frame member 5 so that the rotation axis R, defined by it 7, is parallel to all the main geometric planes of the platform elements first 9 and second 11 and of the wall elements first 15 and second 17. The rotation axis R is therefore perpendicular to the opening of the device for introducing the pallet and the load, approximately delimited by the external (that is opposite to the rotation member 7) edges of the platform elements first 9 and second 11 and wall elements first 15 and second 17.

In the case of a non-overturnable load, the pallet with the load is placed on the first platform element 9 in a horizontal and lowered condition, raised until the load is brought to the height of the wall elements first 15 and second 17, the latter two 15, 17 are operated to clamp and to grab the load between them, allowing the first platform element 9 to lower together with the pallet which can be replaced with another which is then raised until it reaches the bottom of the load which is then released by the wall elements first 15 and second 17 and returned to the initial position by the first platform element 9.

In the case of a overturnable load, the pallet with the load can be placed on the first platform element 9 in a horizontal and lowered condition, raised until the load is brought to the height of the wall elements first 15 and second 17; the second platform element 11 is operated (it is lowered) to contact the upper portion of the load; the wall elements first 15 and second 17 are operated in mutual approach to abut the sides of the load, allowing the motorized rotation member 7 to overturn the pallet with the load together with the elements 9, 11, 15, 17 grabbing it, the subsequent lifting of the first platform element 9 allows the removal and replacement of the pallet. An opposite activation sequence allows the load supported by the new pallet to be brought to the initial position.

The frame member 5 is provided with one or more mutually parallel lifting tracks 21 and with one or more mutually parallel gripping tracks 23 perpendicular to the lifting tracks 21.

These lifting tracks 21 and gripping tracks 23 are perpendicular to the rotation axis R of the motorized rotation member 7 and the respective projections approximately cross each other in their median portions.

At least in an initial operative condition in which the platform elements first 9 and second 11 are horizontal, such lifting tracks 21 and gripping tracks 23 are vertical and horizontal respectively.

Each platform element first 9 and second 11 is perpendicular to the lifting tracks 21 and is provided with respective sliding means moving along said lifting tracks 21 and is provided with respective operating actuators for moving along said tracks 21.

Each wall element first 15 and second 17 is perpendicular to the gripping tracks 23 and is provided with respective sliding means moving along said gripping tracks 23 and it is provided with respective operating actuators for moving along said tracks 23. In particular, and preferably, the frame member 5 is provided with two lifting tracks 21 and two rail-type gripping tracks 23.

The sliding means of each of the platform elements 9, 11 or wall elements 15, 17 for moving along these lifting tracks 21 and gripping tracks 23 are ball-circulating carriage or tracks or slide type and the respective drive actuators are of the electric, hydraulic or pneumatic linear type.

In order to be able to easily operate even with pallets and/or with loads of dimensions even much smaller than the maximum foreseen ones and in order to be able to compact and stabilize loads which have lost their original arrangement and for avoiding falling destabilizing and/or risk, the invention provides that the platforms and the walls can come very close each other without mechanically interfering with each other.

At least for these purposes, each lateral edge parallel to the rotation axis R of each of the platform elements first 9 and second 11 and of the wall elements first 15 and second 17 carries a respective series of alternating recesses and protrusions 10, 12, 16, 18 where the protrusions and recesses of a series can cross with the protrusions and recesses of an adjacent series to bring the platform elements 9, 11 and wall elements 15, 17 closer together even at distances lower than their maximum transversal dimensions. In the following, for summary, the term "series of recesses and protrusions" will be simply referred to as "recesses and protrusions".

The recesses and protrusions 10, 12, 16, 18 are alternated, have a rectangular shape, with a length between one sixth and one third of the maximum transversal dimension of the respective platform element 9, 11 or wall element 15, 17. The width of the recesses is less than the minimum expected dimension of the pieces of the load and the width of the protrusions is equal to or slightly less than the width of the respective recesses. In this way the protrusions of a platform element fit into the recesses of a wall element, and vice versa, just as the fingers of one hand intersect with the fingers of the other hand.

The recesses and protrusions 10, 12, 16, 18 develop on the geometric planes defined by the central portions of the faces of the respective platform elements 9, 11 or wall elements 15, 17 assigned to touch the load.

In other words, each lateral edge parallel to the rotation axis R of each of the platform elements first 9 and second 11 and of the wall elements first 15 and second 17 carries a sort of respective Guelph battlement 10, 12, 16, 18, each consisting of an alternation of rectangular recesses and protrusions.

Preferably, the motorized rotation member 7 is of the slewing bearing type with a perimeter toothed ring engaged by a pinion driven by an electric or hydraulic motor.

Preferably, each of the platform elements first 9 and second 11 comprises a bracket means 31 fixed to the respective sliding means along the lifting tracks 21 connected to a plane means 33 carrying a series of transverse plates 35 mutually spaced to form the recesses and protrusions 10, 12 at their 35 own lateral portions; furthermore each of the wall elements first 15 and second 17 preferably comprises a beam means 43 one end of which is fixed to the respective sliding means along the gripping tracks 23 and carrying a plate 45 whose lateral portions parallel to the rotation axis R are shaped to form recesses and protrusions 16, 18 on their lateral portions.

The invention also provides that the device can be provided with at least:

- position sensors of each of the platform elements 9, 11 or wall elements 15, 17,
- a motorized rotation member 7 rotation sensor;
- one or more pallet and/or load height sensors placed between the platform elements first 9 and second 11, a microprocessor and programmable control device provided with input ports for the data provided by said sensors and with command ports for the operation of each of the actuators and the motorized rotation member 7.

The programmability of the device allows, for example, to also operate on pallets and/or loads with unforeseen characteristics or out of standards dimensions and/or to operate with the wall elements on the load only, without interfering with the pallet even if it is larger in size (or smaller) than the dimensions of the load plan.

Figure 5:
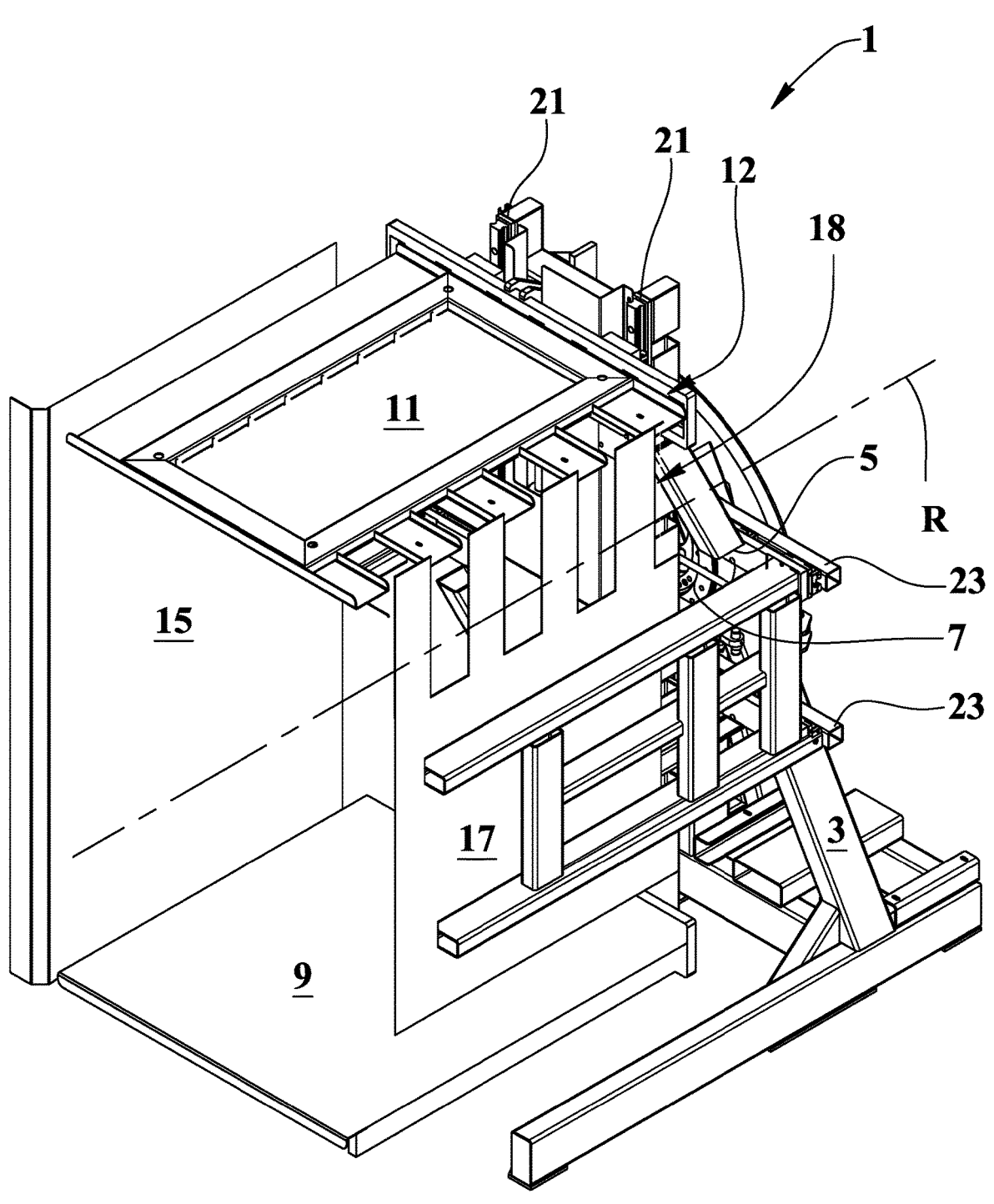
FIG. 5 illustrates an axonometric view of a simplified variant of the device of FIG. 1.
Figure 6:
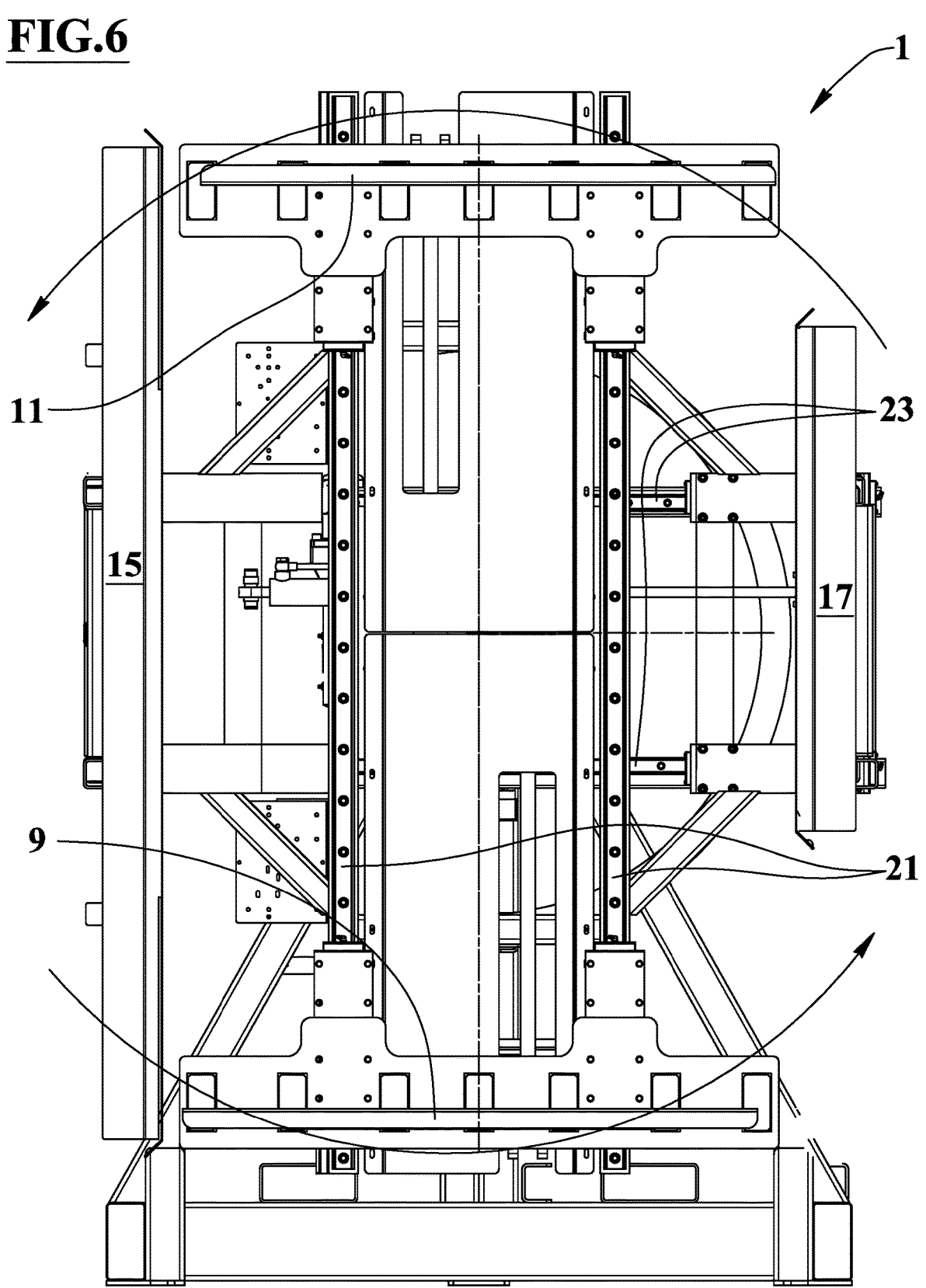
FIGS. 6-8 illustrate respectively front, top and rear orthogonal projection views of the device of FIG. 5.
Figure 7:
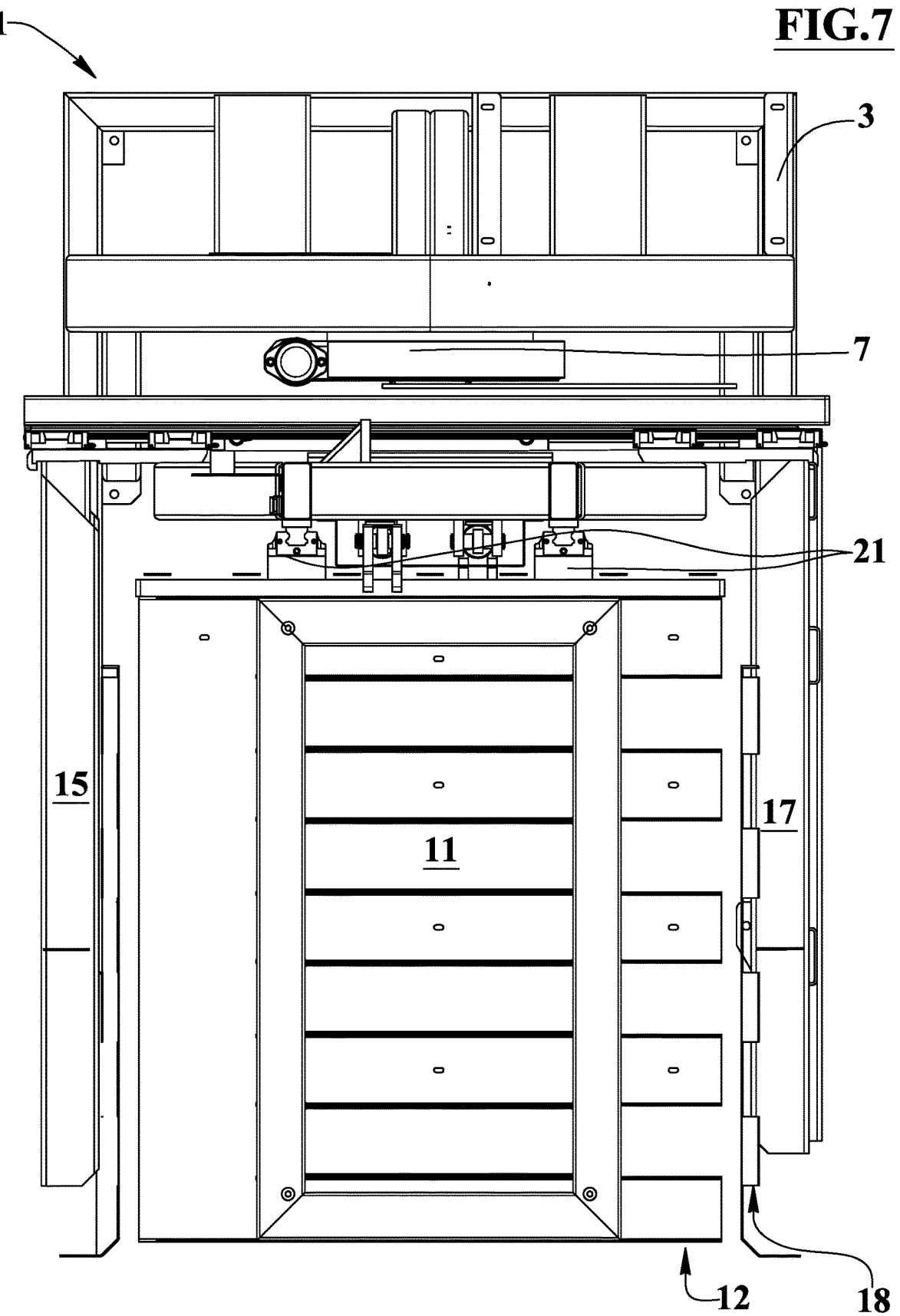
Figure 8:
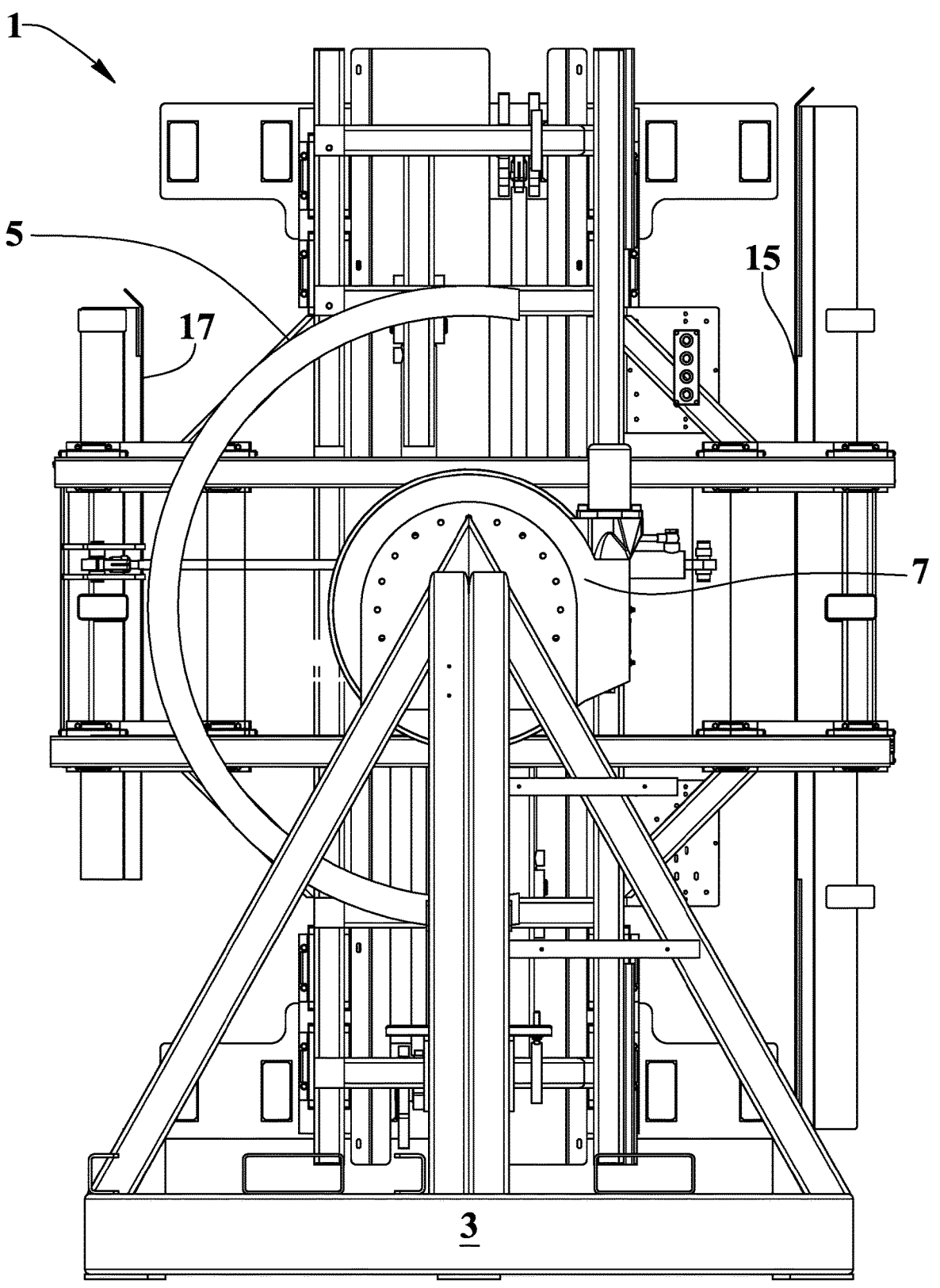

The variant of the device of FIGS. 5-8 is simplified compared to the one previously described and differs from it in that only the first platform element 9 can be operated, by means of a respective actuator, towards and away from the second platform element 11 which, vice versa, is fixed or only manually adjustable and due to the fact that only the second wall element 17 can be operated, by means of a respective actuator, towards and away from the first wall element 15 which is fixed. Furthermore, in the variant only the lateral and adjacent edges of the second platform element 11 and the second wall element 17 are provided with the respective complementary recesses and protrusions 12, 18 which can cross each other while the other lateral edges are devoid of recesses.

The operation of the variant of the device provides that, in the case of a non-overturnable load, the pallet with the load is placed on the first platform element 9 in a horizontal and lowered condition, raised until the load is brought to the height of the wall elements first 15 and second 17; only the latter 17 is activated to clamp the load between the wall elements first 15 and second 17, thus allowing the first platform element 9 to lower together with the pallet which can be replaced with another which is then raised until meeting the load which is released by the wall elements first 15 and second 17 and returned to the initial position by the first platform element 9.

In the case of a overturnable load, the operation of the variant provides that the pallet with the load can be placed on the first platform element 9 in a horizontal and lowered condition, raised until the load is brought to the height of the wall elements first 15 and second 17 and the upper portion of the load is placed against the second platform element 11; the second wall element 17 can be operated to obtain the abutment of the sides of the load with such wall elements first 15 and second 17, allowing the motorized rotation member 7 to overturn the pallet with the load and with the elements abutting it, lifting the first platform element 9 so allowing the removal and replacement of the pallet; an opposite activation sequence allows the load supported by the new pallet to be brought to the initial condition.

It is important to underline that the special provision to orientate the rotation axis R of the motorized rotation member 7 of the frame member 5 parallel to all the geometric planes of the platform elements first 9 and second 11 and of the wall elements first 15 and second 17 allows to start the operations of the device in any condition where any of the platform elements first 9 and second 11 and wall elements first 15 and second 17 is in the lower and horizontal position. For instance, in case of a load consisting of elongated panels, as solar panels, horizontally laying on the pallet, having a length bigger than the maximum distance between the wall elements first 15 and second 17 it is possible to rotate 90° the frame member 5 and to lower it to position one of the wall elements first 15 and second 17 in the horizontal lower position and to load the solar panel and the respective pallet onto said lowered wall elements first 15 and second 17 and to start the operations as above described. Said special provision further provides the possibility to rotate the load in any direction and angle without the risk of falling and to stabilize some load, for instance when some boxes or containers of the load are shifted or tilted toward a side.

The invention claimed is:

1. Multifunctional device comprising:
   a base element (3) for placement on a floor;
   a frame member (5) connected to the base element (3) via a motorized rotation member (7) operable to rotate the frame member around a horizontal or nearly horizontal rotation axis (R);
   said device further comprising:
   at least one pair of platform elements first (9) and second (11) facing each other and defining respective geometric planes parallel to each other;
   at least one pair of wall elements first (15) and second (17) facing each other and defining respective geometric planes parallel to each other and perpendicular to said platform elements (9, 11), where at least the second wall element (17) is operable, by means of a respective actuator (49) to approach and move away from the first wall element (15);
   wherein the at least one first platform element (9) is translatable by means of a respective actuator (51) to approach and move away from the second platform element (11) and wherein the rotation axis (R) is parallel to the geometric planes of the at least one pair of platform elements first (9) and second (11) and of the at least one pair of wall elements first (15) and second (17), wherein at least the side and adjacent edges of the second platform element (11) and of the second wall element (17) are provided with respective complementary recesses and protrusions (12, 18) and which can cross each other.

2. Multifunctional device comprising:
   a base element (3) for placement on a floor;
   a frame member (5) connected to the base element (3) via a motorized rotation member (7) operable to rotate the frame member around a horizontal or nearly horizontal rotation axis (R):
   said device further comprising:
   at least one pair of platform elements first (9) and second (11) facing each other and defining respective geometric planes parallel to each other;
   at least one pair of wall elements first (15) and second (17) facing each other and defining respective geometric planes parallel to each other and perpendicular to said platform elements (9, 11), where at least the second wall element (17) is operable, by means of a respective actuator (49) to approach and move away from the first wall element (15);
   wherein the at least one first platform element (9) is translatable by means of a respective actuator (51) to approach and move away from the second platform element (11) and wherein the rotation axis (R) is parallel to the geometric planes of the at least one pair of platform elements first (9) and second (11) and of the at least one pair of wall elements first (15) and second (17), wherein the frame member (5) is provided with one or more lifting tracks (21) and with one or more gripping tracks (23) perpendicular to the one or more lifting tracks (21), wherein said one or more lifting tracks (21) and said one or more gripping tracks (23) are perpendicular to the rotation axis (R);
   where, at least in an initial operating condition in which the first (9) and second (11) platform elements are horizontal, these lifting (21) and gripping (23) tracks are respectively vertical and horizontal and in that each first (9) and second (11) platform element is perpendicular to the lifting tracks (21) and is provided with respective sliding means (52, 53) movable along said lifting tracks (21) and with respective actuation actuators (51, 54) for moving along said lifting tracks (21) and in that each first (15) and second (17) wall element is perpendicular to the gripping tracks (23) and is provided with respective sliding means (56, 57) movable along said gripping tracks (23) and with respective actuation actuators (49, 50) for moving along said gripping tracks (23), and wherein each side edge parallel to the rotation axis (R) of each of the first (9) and second (11) platform elements and of the first (15) and second (17) wall elements bears respective recesses and protrusions (10, 12, 16, 18) that are complementary and that can cross each other.

3. Device according to claim 2, wherein the recesses and protrusions (10, 12, 16, 18) are alternated, have a rectangular shape, with a length between one sixth and one third of the maximum transversal dimension of the respective platform (9, 11) or wall (15, 17) element, where the width of the recesses is less than the minimum expected size of the constituents of a load on the pallet and the width of the protrusions is equal to or slightly less than the width of the respective recesses.

4. Device according to claim 2, wherein the recesses and protrusions (10, 12, 16, 18) develop on the geometric planes defined by the central portions of the faces of the respective platform (9, 11) or wall (15, 17) elements assigned to match with a load on the pallet.

5. Multifunctional device comprising:
a base element (3) for placement on a floor;
a frame member (5) connected to the base element (3) via a motorized rotation member (7) operable to rotate the frame member around a horizontal or nearly horizontal rotation axis (R);
said device further comprising:
at least one pair of platform elements first (9) and second (11) facing each other and defining respective geometric planes parallel to each other;
at least one pair of wall elements first (15) and second (17) facing each other and defining respective geometric planes parallel to each other and perpendicular to said platform elements (9, 11), where at least the second wall element (17) is operable, by means of a respective actuator (49) to approach and move away from the first wall element (15);
wherein the at least one first platform element (9) is translatable by means of a respective actuator (51) to approach and move away from the second platform element (11) and wherein the rotation axis (R) is parallel to the geometric planes of the at least one pair of platform elements first (9) and second (11) and of the at least one pair of wall elements first (15) and second (17), wherein the frame member (5) is provided with one or more lifting tracks (21) and with one or more gripping tracks (23) perpendicular to the one or more lifting tracks (21), wherein said one or more lifting tracks (21) and said one or more gripping tracks (23) are perpendicular to the rotation axis (R);
where, at least in an initial operating condition in which the first (9) and second (11) platform elements are horizontal, these lifting (21) and gripping (23) tracks are respectively vertical and horizontal and in that each first (9) and second (11) platform element is perpendicular to the lifting tracks (21) and is provided with respective sliding means (52, 53) movable along said lifting tracks (21) and with respective actuation actuators (51, 54) for moving along said lifting tracks (21) and in that each first (15) and second (17) wall element is perpendicular to the gripping tracks (23) and is provided with respective sliding means (56, 57) movable along said gripping tracks (23) and with respective actuation actuators (49, 50) for moving along said gripping tracks (23) and wherein the frame member (5) is provided with two rail-type lifting tracks (21) and two rail-type gripping tracks (23) and that the sliding means of each of the platform (9, 11) or wall (15, 17) elements along these lifting (21) and gripping (23) tracks are ball, carriage or slide elements and that the respective actuation actuators are of electric, hydraulic or pneumatic linear type.

6. Multifunctional device comprising:
a base element (3) for placement on a floor;
a frame member (5) connected to the base element (3) via a motorized rotation member (7) operable to rotate the frame member around a horizontal or nearly horizontal rotation axis (R);
said device further comprising:
at least one pair of platform elements first (9) and second (11) facing each other and defining respective geometric planes parallel to each other;
at least one pair of wall elements first (15) and second (17) facing each other and defining respective geometric planes parallel to each other and perpendicular to said platform elements (9, 11), where at least the second wall element (17) is operable, by means of a respective actuator (49) to approach and move away from the first wall element (15);
wherein the at least one first platform element (9) is translatable by means of a respective actuator (51) to approach and move away from the second platform element (11) and wherein the rotation axis (R) is parallel to the geometric planes of the at least one pair of platform elements first (9) and second (11) and of the at least one pair of wall elements first (15) and second (17), and wherein the motorized rotation member (7) is of the slewing bearing type with a peripheral ring gear engaged by a pinion actuated by an electric or hydraulic motor.

7. Multifunctional device comprising:
a base element (3) for placement on a floor;
a frame member (5) connected to the base element (3) via a motorized rotation member (7) operable to rotate the frame member around a horizontal or nearly horizontal rotation axis (R):
said device further comprising:
at least one pair of platform elements first (9) and second (11) facing each other and defining respective geometric planes parallel to each other;
at least one pair of wall elements first (15) and second (17) facing each other and defining respective geometric planes parallel to each other and perpendicular to said platform elements (9, 11), where at least the second wall element (17) is operable, by means of a respective actuator (49) to approach and move away from the first wall element (15);
wherein the at least one first platform element (9) is translatable by means of a respective actuator (51) to approach and move away from the second platform element (11) and wherein the rotation axis (R) is parallel to the geometric planes of the at least one pair of platform elements first (9) and second (11) and of the at least one pair of wall elements first (15) and second (17), wherein each of the first (9) and second (11) platform elements comprises a bracket means (31) fixed to the respective sliding means along the lifting tracks (21) connected to a plane means (33) carrying a series of transverse plates (35) mutually spaced apart to form the recesses and protrusions (10, 12) at their side portions and in that each of the first (15) and second (17) wall elements comprises a beam means (43) one end of which is fixed to the respective sliding means along the gripping tracks (23) and carrying a plate (45) whose side portions parallel to the rotation axis (R) are shaped to form the recesses and protrusions (16, 18) on their lateral portions.

8. Multifunctional device comprising:

a base element (3) for placement on a floor;

a frame member (5) connected to the base element (3) via a motorized rotation member (7) operable to rotate the frame member around a horizontal or nearly horizontal rotation axis (R);

said device further comprising:

at least one pair of platform elements first (9) and second (11) facing each other and defining respective geometric planes parallel to each other;

at least one pair of wall elements first (15) and second (17) facing each other and defining respective geometric planes parallel to each other and perpendicular to said platform elements (9, 11), where at least the second wall element (17) is operable, by means of a respective actuator (49) to approach and move away from the first wall element (15);

wherein the at least one first platform element (9) is translatable by means of a respective actuator (51) to approach and move away from the second platform element (11) and wherein the rotation axis (R) is parallel to the geometric planes of the at least one pair of platform elements first (9) and second (11) and of the at least one pair of wall elements first (15) and second (17), further comprising:

position sensors (60, 61; 62, 63) of each of the platform (9, 11) or wall (15, 17) elements, a rotation sensor (64) of the motorized rotation member (7), one or more pallet and/or load height sensors (65) placed between the first (9) and second (11) platform elements, a programmable microprocessor control device (66) provided with input ports for the data supplied by said sensors and command ports for operating each of the actuators and the motorized rotation member (7).

\* \* \* \* \*